(12) United States Patent
Claessen

(10) Patent No.: US 8,681,002 B2
(45) Date of Patent: *Mar. 25, 2014

(54) DEVICE AND METHOD OF COUPLING A PROCESSOR TO AN RFID TAG

(75) Inventor: Albertus Maria Geradus Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,391

(22) Filed: Jun. 11, 2012

(65) Prior Publication Data

US 2012/0242458 A1  Sep. 27, 2012

Related U.S. Application Data

(63) Continuation of application No. 12/270,364, filed on Nov. 13, 2008, now Pat. No. 8,269,608.

(51) Int. Cl.
G08B 13/14 (2006.01)

(52) U.S. Cl.
USPC ............. 340/572.1; 340/539.1; 340/539.11; 340/572.4; 340/10.1

(58) Field of Classification Search
None
See application file for complete search history.

(56) References Cited

U.S. PATENT DOCUMENTS

| | | | |
|---|---|---|---|
| 6,420,996 B1 | 7/2002 | Stopczynski et al. | |
| 7,706,834 B2 | 4/2010 | Kim et al. | |
| 2004/0267297 A1* | 12/2004 | Malackowski | 606/167 |
| 2005/0079817 A1* | 4/2005 | Kotola et al. | 455/41.2 |
| 2006/0145817 A1 | 7/2006 | Aikawa et al. | |
| 2006/0208903 A1 | 9/2006 | Loh et al. | |
| 2006/0258323 A1* | 11/2006 | Hara et al. | 455/343.2 |
| 2007/0141997 A1 | 6/2007 | Wulff et al. | |
| 2007/0216519 A1* | 9/2007 | Yokoo et al. | 340/10.1 |
| 2008/0278325 A1* | 11/2008 | Zimman et al. | 340/572.1 |
| 2008/0281633 A1* | 11/2008 | Burdea et al. | 705/2 |
| 2009/0179761 A1 | 7/2009 | Chang et al. | |

* cited by examiner

Primary Examiner — Benjamin C Lee
Assistant Examiner — Curtis King
(74) Attorney, Agent, or Firm — Peter H. Priest

(57) ABSTRACT

An integrated scanner, scale and touchscreen display ("integrated touchscreen scanner") is addressed. In one alternative, the integrated touchscreen scanner further includes a printer for printing receipts, coupons and the like. The integrated touchscreen scanner is designed for flush mounting in a checkout or self-checkout stand. Keystrokes, icon selection and the like may be suitably sensed employing weigh cells in the scale of the integrated touchscreen scanner. Additionally, the display may be partitioned into a customer portion and a checker portion. This partitioning may be fixed or dynamically adjusted in response to the state of the transaction.

20 Claims, 2 Drawing Sheets

DEVICE AND METHOD OF COUPLING A PROCESSOR TO AN RFID TAG

The present application is a continuation of U.S. patent application Ser. No. 12/270,364 filed on Nov. 13, 2008.

BACKGROUND OF THE INVENITON

Radio frequency identification (RFID) tags are known for their usefulness in identifying items.

It would be desirable to apply RFID tags to other applications by providing a device and method of coupling a processor to an RFID tag.

A device and method of coupling a processor to a radio frequency identification (RFID) tag is provided.

The device includes an RFID tag which includes a memory, an antenna coupled to the RFID tag, and a processor coupled to the RFID tag in parallel with the antenna.

The method includes sending a first modulated signal to the RFID tag by a processor wired to the RFID tag, and receiving modulation in a second modulated signal from the RFID tag through a detector by the processor.

DETAILED DESCRIPTION

Figure 1:
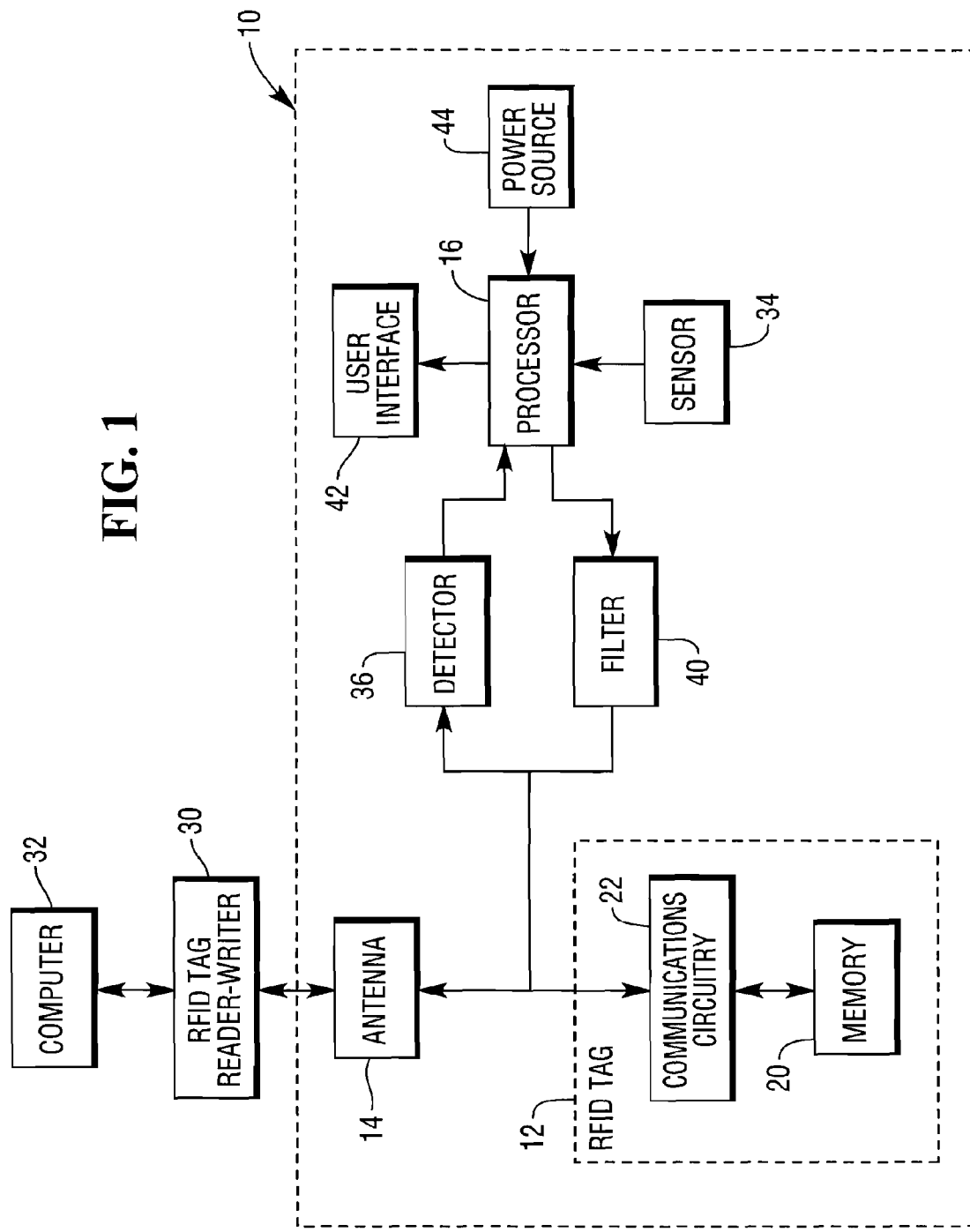
FIG. 1 is a block diagram illustrating an example device.

With reference to FIG. 1, an example device 10 includes radio frequency identification (RFID) tag 12, antenna 14, and processor 16.

RFID tag 12 includes memory 20 and communication circuitry 22. An example RFID tag 12 may include a standard EPCglobal Generation 2 wireless, contactless, RFID tag which wirelessly communicates in the UHF band using standard EPCglobal generation 2 protocols.

Memory 20 stores information.

Communication circuitry 22 may send and receive information to and from computer 32 via RFID tag reader-writer 30. Communication circuitry 22 may send and receive information directly to and from processor 16.

Communications circuitry 22 captures energy from RFID reader-writer signals and from processor signals. Communications circuitry 22 uses this energy to power RFID tag 12.

An important feature of the invention is a dual communications interface to RFID tag 12. One interface is antenna 14, which is a normal interface for which RFID tags 12 are typically designed. The other interface is a wired interface to processor 16.

Antenna 14 wirelessly sends and receives the information from RFID tag reader-writer 30.

Processor 16 communicates with RFID tag 12 and reads or writes information from or to memory 20 using standard EPCglobal Generation 2 protocols.

In one example implementation, processor 16 generates a clock signal which serves as a carrier signal. For one type of RFID tag made by Texas Instruments, the clock frequency may be as low as about 3 MHz. Processor 6 modulates the clock signal with information by switching the clock signal on and off.

For this type of communication between processor 16 and RFID tag 12, device 10 may include detector 36. Detector 36 detects modulation on the low frequency carrier signal that is generated by RFID tag 12.

Processor 16 couples to connections between communication circuitry 22 and antenna 14. Alternatively, communication circuitry 22 may have two sets of connections, a first set for antenna 14 and a second set for processor 16.

Processor 16 may include its own wake up circuitry so that processor 16 may read information from RFID tag 12 at predetermined times.

Processor 16 may read information from RFID tag 12 under other conditions. For example, processor 16 may be signaled to read the information when RFID tag 12 is activated by RFID tag reader-writer 30 or when RFID tag 12 is otherwise turned on.

Processor 16 may store information in RFID tag 12. For example processor 16 may be coupled to one or more sensors 34, such as temperature, light level, pressure, activation count, among others, and store sensor data in RFID tag 12 for later interrogation by RFID tag reader-writer 30 and use by computer 32.

Processor 16 may also read information in RFID tag 12. For example, computer 32 may transmit data to be stored in memory 20 via RFID reader-writer 30. Processor 16 interrogates memory 20 during a next scheduled or otherwise initiated wakeup cycle. Processor 16 may use the data for any number of control functions.

Processor 16 may read or store protocol related information, such as an acknowledgement or a request for additional information, within RFID tag 12.

Processor 16 may execute special purpose software programs using RFID tag 12 to store the special purpose software or data resulting from execution of the special purpose software.

Device 10 may additionally include filter 40, user interface 42, and power source 44.

Filter 40 isolates processor 16 from RF signals in order to prevent processor 16 from loading antenna 14 and negatively affecting RF communication between RFID reader-writer 30 and RFID tag 12. Filter 40 may include an inductive or capacitive filter or a combination of both.

An optional user interface 42 facilitates user interaction with processor 16. User interface 42 may include a display, input device, or combination of both.

Power source 44 provides power to processor 16 and user interface 42. Power source 44 may include a battery.

In addition to those applications mentioned above, device 10 may have many other applications. For example, device 10 may be used as a lock to discourage theft of electronic equipment. RFID tag reader-writer 30 may lock device 10 by sending an activate command. RFID tag 12 receives the activate command. Processor 16 wakes up in response to the activate command and prevents the equipment from being activated without entry of a proper key through user interface 42.

Alternatively, processor 16 may read information stored within RFID tag 12 and determine whether to activate device 10, or something equipped with device 10. For example, device 10 may be embedded into a DVD player and the information may indicate to device 10 whether to activate the DVD player to play a DVD movie. Following a first wake up, processor 16 checks the state of RFID tag 12 and determines that device 10 was legitimately purchased and initialized. Processor 16 applies power to device 10.

As another example, device 10 may be used for one-way or two-way communications. For example, RFID tag 12 may function as a mailbox for storing messages. RFID tag reader-writer 30 and processor 16 read and write messages to the mailbox.

As another example, device 10 may be used as an electronic shelf display or shelf locator device. Processor 16 reads price and other information from RFID tag 12. Processor 16 may read a command to display price information on user interface 42 from RFID tag 12 or start blinking an LED or other means of indication to facilitate locating an item with which device 10 is associated on a shelf, in a storage bin or other location.

For example, computer 32 may include a kiosk and user interface 42 may include a light emitting diode (LED). The customer selects a certain type and/or size of an item, such as clothing, at the kiosk. The kiosk then programs RFID tag 12 associated with an article selected by the customer to start blinking. Processor 16 at it next wake-up interval interrogates RFID tag 12, detects that RFID tag 12 is activated, and starts blinking the LED for a certain period of time, sufficient to allow the customer to identify the article without having to sort through piles of articles.

Figure 2:
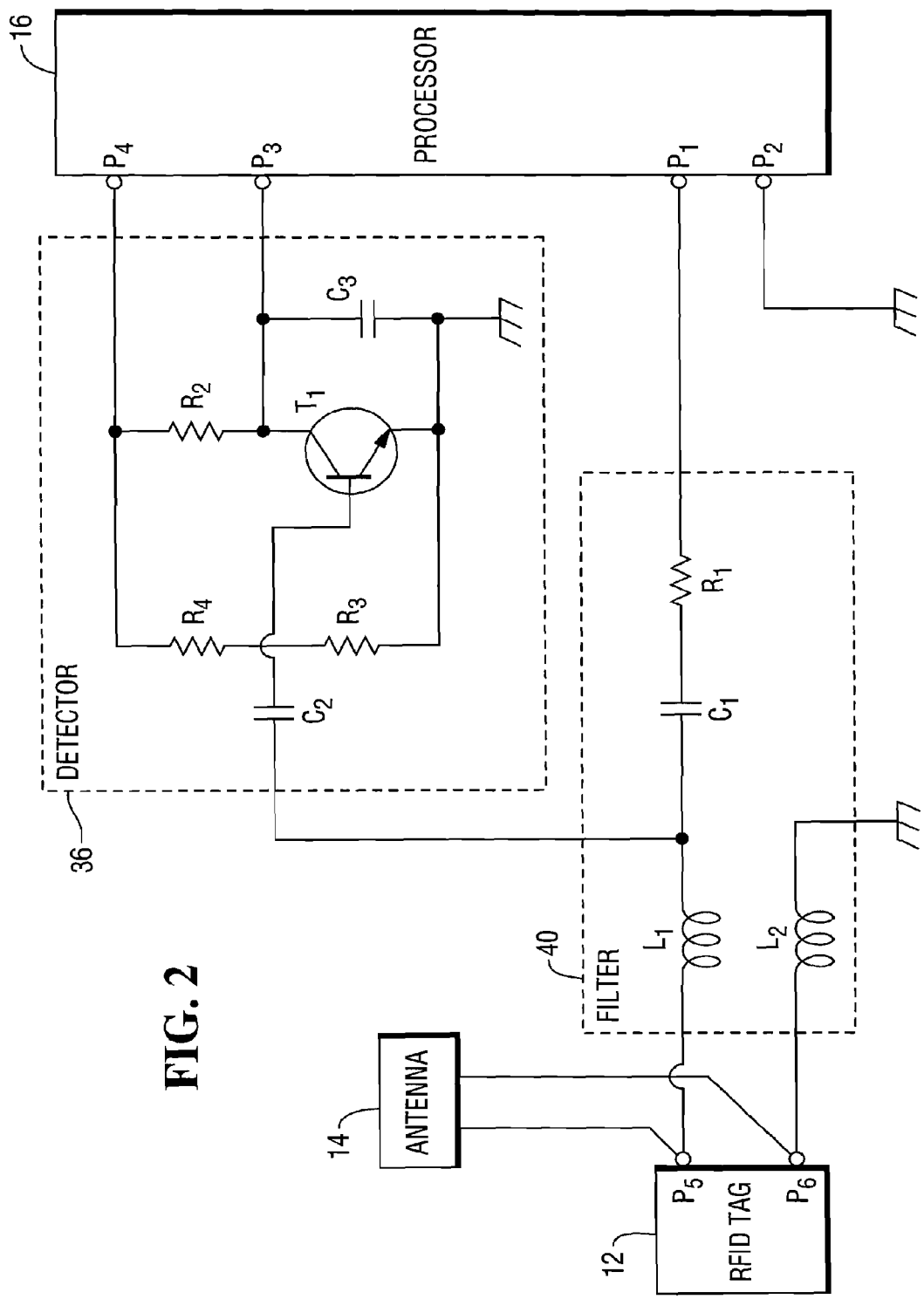
FIG. 2 is a circuit diagram illustrating an example communications interface between an RFID tag and a processor of the device.

With reference to FIG. 2, detector 36 may include capacitors C2 and C3, inductors L1 and L2, resistors R2, R3, and R4, and transistor T1.

Capacitor C2 blocks direct current components from reaching pad P5 of RFID tag 12. Capacitor C2 may have a value of 100 pF.

Resistors R2 and R4 establish proper direct current bias for transistor T1. Processor 16 applies direct current voltage to resistors R2 and R4 from pad P4. Resistors R2 and R4 may have values of 10 kΩ.

Together, transistor T1, resistor R3, and capacitor C3 demodulate signals from pad PS of RFID tag 12 and provide the demodulated signals to pad P3 of processor 16. Capacitor C3 stores up charge on the rising edge of an input signal and releases it slowly through resistor R3 when the signal falls. Resistor R3 may have a value of 1 kΩ. Capacitor C3 may have a value of 100 pF. Transistor T1 may include a 2N3904 transistor.

Example filter 40 may include inductors L1 and L2, capacitor C1, and resistor R1. Inductors L1 and L2 may have a value of 100 nH. Capacitor C1 may have a value of 470 pF. Resistor R1 may have a value of 499 Ω.

Filter 40 blocks high frequency signals from pad P5 of RFID tag 12, but allows lower frequency signals (for example, 16 MHz) from pad P1 of processor 16 to pass to pad P5 of RFID tag 12.

Although particular reference has been made to certain embodiments, variations and modifications are also envisioned within the spirit and scope of the following claims.

I claim:

1. A device comprising:
   an RFID tag including communications circuitry and a memory;
   an antenna coupled via first and second antenna terminals of the RFID tag to the communications circuitry of the RFID tag for wirelessly communicating with an RFID tag reader or writer; and
   a processor coupled via the first and second antenna terminals to the RFID tag in parallel with the antenna, and communicating with the RFID tag through a filter connected in parallel with a detector, wherein the filter and detector are wired between the processor and the RFID tag.

2. The device of claim 1, wherein the RFID tag identifies an item.

3. The device of claim 1, wherein the detector is connected through an inductor of the filter to a common port of the RFID tag to which one terminal of the antenna is connected and between the RFID tag and the processor to detect modulation of a low frequency carrier signal generated by the RFID tag.

4. The device of claim 1, further comprising a filter between the RFID tag and the processor which isolates the processor from radio frequency signals to prevent the processor from loading the antenna and connects a port of the processor to a common port of the RFID tag to which one terminal of the antenna is connected.

5. The device of claim 1, wherein the processor reads data from the memory.

6. The device of claim 5, wherein the data was stored in the memory by an RFID tag writer.

7. The device of claim 1, wherein the processor stores data in the memory by generating a clock signal which serves as a carrier signal and modulating the clock signal with said data by switching the clock signal on and off.

8. The device of claim 7, wherein the processor stores the data for later interrogation by an RFID tag reader.

9. The device of claim 1, further comprising a sensor coupled to the processor, wherein the processor stores data from the sensor in the memory for later interrogation by an RFID tag reader.

10. The device of claim 1, further comprising a user interface coupled to the processor.

11. The device of claim 10, wherein the user interface comprises a display.

12. The device of claim 10, wherein the user interface comprises an input device.

13. The device of claim 1, further comprising a power source coupled to the processor.

14. The device of claim 1, wherein the processor controls another device based upon data the processor receives from the memory.

15. The device of claim 1, wherein the processor applies power from a power source to activate another device based upon data the processor receives from the memory.

16. The device of claim 1, wherein the memory functions as a mailbox to store messages between the processor and a computer which reads and writes the messages using an RFID tag reader-writer.

17. A device comprising:
   an RFID tag including a memory, communication circuitry, and first and second antenna terminals, wherein the communication circuitry produces a first modulated signal having a first carrier frequency;
   an antenna connected to the first and second antenna terminals;
   a circuit connected to the first and second antenna terminals including a detector for detecting modulation in the first modulated signal and a filter for blocking the first modulated signal; and
   a processor for receiving first data from an RFID tag reader-writer from the memory, and for sending second data to the memory for later retrieval by the RF1D tag reader-writer through the antenna wherein the processor includes a data input terminal coupled to the detector for receiving the first data, and a data output terminal coupled to the filter for sending the second data, and wherein the processor generates a second modulated signal from the data output terminal having a second carrier frequency lower than the first carrier frequency and capable of passing through the filter with the second data to the RFID tag.

18. The device of claim 17, wherein the processor generates the second modulated signal by producing a clock signal for the second carrier signal and modulating the clock signal by switching the clock signal on and off.

19. A method of communicating with an RFID tag comprising:
- sending a first modulated signal to the RFID tag by a processor wired through a filter to first and second antenna terminals of the RFID tag to transmit data by the processor for storing in a memory of the RFID tag;
- receiving modulation in a second modulated signal from the RFID tag through a detector, connected in parallel to the filter, by the processor; and
- communicating with an RFID tag reader or writer utilizing an antenna connected to the first and second antenna terminals and communication circuitry of the RFID tag.

20. The method of claim 19, wherein the second modulated signal contains second data stored in a memory of the RFID tag by an RFID tag reader-writer through the antenna for later retrieval by the processor.

* * * * *